United States Patent
Nitta et al.

(10) Patent No.: US 9,702,985 B2
(45) Date of Patent: Jul. 11, 2017

(54) METHOD FOR PRODUCING RADIATION DETECTOR

(71) Applicant: HITACHI METALS, LTD., Tokyo (JP)

(72) Inventors: Hideo Nitta, Mishima-gun (JP); Akira Shigekawa, Mishima-gun (JP)

(73) Assignee: HITACHI METALS, LTD., Tokyo (JP)

(*) Notice: Subject to any disclaimer, the term of this patent is extended or adjusted under 35 U.S.C. 154(b) by 42 days.

(21) Appl. No.: 14/437,883

(22) PCT Filed: Oct. 23, 2013

(86) PCT No.: PCT/JP2013/078714
§ 371 (c)(1),
(2) Date: Apr. 23, 2015

(87) PCT Pub. No.: WO2014/065328
PCT Pub. Date: May 1, 2014

(65) Prior Publication Data
US 2015/0268357 A1    Sep. 24, 2015

(30) Foreign Application Priority Data
Oct. 24, 2012  (JP) ................. 2012-234256

(51) Int. Cl.
*B29C 65/52* (2006.01)
*B32B 37/12* (2006.01)
(Continued)

(52) U.S. Cl.
CPC ....... *G01T 1/2008* (2013.01); *Y10T 156/1074* (2015.01)

(58) Field of Classification Search
USPC ................. 156/247, 250, 263, 265
See application file for complete search history.

(56) References Cited

U.S. PATENT DOCUMENTS 4,511,799 A    4/1985  Bjorkholm
6,793,857 B2   9/2004  Otto
(Continued)

FOREIGN PATENT DOCUMENTS

JP    2001-174564 A    6/2001
JP    2002-236182 A    8/2002
(Continued)

OTHER PUBLICATIONS

International Search Report for PCT/JP2013/078714 dated Dec. 17, 2013 [PCT/ISA/210].

*Primary Examiner* — Sing P Chan
(74) *Attorney, Agent, or Firm* — Sughrue Mion, PLLC

(57) ABSTRACT

A method for producing a radiation detector comprising pluralities of first and second cells constituted by scintillators having different compositions for different detection sensitivity distributions of radiation energy, pluralities of light-receiving elements, and reflective layers, comprising a step of forming first and second cell arrays having at least m×n first and second cells via reflective layers from first and second scintillator plates, wherein m and n are natural numbers of 2 or more, which may be the same or different; a step of cutting the first and second cell arrays to obtain first and second single arrays each having at least m×1 first and second cells via reflective layers; a step of aligning the first and second single arrays with a light-receiving element array having at least m×2 light-receiving elements; and a step of adhering the first and second single arrays to the light-receiving element array.

7 Claims, 14 Drawing Sheets

(51) Int. Cl.
*B32B 37/18* (2006.01)
*B32B 38/04* (2006.01)
*B32B 38/10* (2006.01)
*G01T 1/20* (2006.01)

(56) References Cited

U.S. PATENT DOCUMENTS

| | | |
|---|---|---|
| 7,728,302 B2 | 6/2010 | Zeitler et al. |
| 8,391,439 B2 | 3/2013 | Levene et al. |
| 2002/0054954 A1 | 5/2002 | Otto |
| 2003/0236388 A1* | 12/2003 | Armstrong ............. C08G 59/18 528/408 |
| 2004/0003883 A1* | 1/2004 | Kiuchi ................... C09J 7/0207 156/77 |
| 2006/0067472 A1* | 3/2006 | Possin .................... H05G 1/265 378/98.9 |
| 2009/0173885 A1 | 7/2009 | Zeitler et al. |
| 2010/0220833 A1 | 9/2010 | Levene et al. |
| 2012/0211669 A1* | 8/2012 | Itaya .................... G01V 5/0025 250/458.1 |
| 2012/0267539 A1* | 10/2012 | Shinba ................. G01T 1/2018 250/366 |
| 2015/0059963 A1 | 3/2015 | Nitta |

FOREIGN PATENT DOCUMENTS

| | | |
|---|---|---|
| JP | 2004-061492 A | 2/2004 |
| JP | 2009-524015 A | 6/2009 |
| JP | 2012-199543 A | 10/2012 |
| JP | 2013-228355 A | 11/2013 |
| WO | 2006114715 A2 | 11/2006 |

* cited by examiner

Step 1-2

Step 1-3

Step 1-4

Step 1-8

METHOD FOR PRODUCING RADIATION DETECTOR

CROSS REFERENCE TO RELATED APPLICATIONS

This application is a National Stage of International Application No. PCT/JP2013/078714 filed Oct. 23, 2013 (claiming priority based on Japanese Patent Application No. 2012-234256 filed Oct. 24, 2012), the contents of which are incorporated herein by reference in their entirety.

FIELD OF THE INVENTION

The present invention relates to a method for efficiently producing a dual-array radiation detector comprising two types of scintillators having different compositions.

BACKGROUND OF THE INVENTION

One of radiographic inspection apparatuses is a computed tomography (CT) apparatus. The CT apparatus comprises an X-ray tube for radiating X-ray fan beams, and a radiation detector comprising a large number of radiation-detecting elements. The X-ray tube and the radiation detector are arranged oppositely to each other with an object to be measured at a center. X-ray fan beams radiated from the X-ray tube pass through the object to be measured, and are detected by the radiation detector. With every radiation having a changed angle, X-ray absorption data of the object are collected to calculate X-ray absorbance at each position in each cross section of the object by computer analysis, thereby forming a cross-sectional image based on the X-ray absorbance. The radiation-detecting elements are constituted by scintillator cells and light-receiving elements. In the CT apparatus, the scintillator cells emit light when receiving irradiated X rays, and the light-receiving elements receive light from the cells to convert it to electric signals. Used as radiation detectors are detectors comprising scintillator cells and silicon photodiodes as light-receiving elements, or detectors comprising scintillator cells and photoelectron multipliers as light-receiving elements.

As a dual-array radiation detector comprising two types of scintillators having different compositions for different detection sensitivity distributions of radiation energy, for example, U.S. Pat. No. 4,511,799 discloses a dual-array radiation detector comprising first scintillators emitting light to be received by first diodes, and second scintillators emitting light to be received by second diodes. Also, WO 2006/114715 A discloses a dual-array radiation detector comprising a first light detector converting low-energy radiation to light which is then converted to electric signals, and a second light detector converting high-energy radiation to light which is then converted to electric signals. The detection sensitivity distribution of radiation energy is a distribution of radiation energy absorbed by scintillator plates, which depends on the composition of scintillators. However, U.S. Pat. No. 4,511,799 and WO 2006/114715 A do not disclose specific production methods of dual-array radiation detectors.

JP 2002-236182 A (U.S. Pat. No. 6,793,857) discloses a method for producing a one-dimensional or multi-dimensional detector array comprising scintillator cells having different widths in combination. In this method, (a) a composite layer comprising a radiation-sensitive sensor layer and a base layer is formed, and (b) the sensor layer is divided to individual insulated elements by cutting from the opposite side to the base layer, thereby forming partition walls in the sensor layer. However, in the method of JP 2002-236182 A, the number of steps increases with larger numbers of cells, making efficient production difficult.

JP 2001-174564 A discloses a dual-array X-ray detector comprising pluralities of scintillator elements reacting X rays of different energy levels, which are arranged in an X rays passing direction, and light-detecting elements each corresponding to each scintillator element, which are arranged in a perpendicular direction to the scintillator elements, pluralities of scintillator elements and pluralities of light-detecting elements being respectively arranged in line. Pluralities of scintillator elements are integrally molded with a light-reflecting material. However, JP 2001-174564 A does not specifically disclose a method for producing the dual-array X-ray detector.

JP 2009-524015 A discloses a method for producing a scintillation array comprising the steps of forming a scintillation ceramic wafer, forming pluralities of slits in two perpendicular directions on an upper surface of the ceramic wafer, and partially oxidizing a surface of the ceramic wafer to form a reflective layer. However, the method of JP 2009-524015 A forms a scintillation array by one type of a scintillation ceramic, not by two types of scintillation cells.

OBJECT OF THE INVENTION

Accordingly, an object of the present invention is to provide a method for efficiently producing a dual-array radiation detector comprising two types of scintillators having different compositions.

SUMMARY OF THE INVENTION

The method of the present invention for producing a radiation detector comprising pluralities of first and second cells constituted by scintillators having different compositions for different detection sensitivity distributions of radiation energy, pluralities of light-receiving elements each receiving light emitted from each of the first and second cells by radiation to convert the light to electric signals, and reflective layers for guiding the light emitted from the first and second cells to the light-receiving elements, comprises a step of forming a first cell array having at least m×n first cells via reflective layers from a first scintillator plate, wherein m and n are natural numbers of 2 or more, which may be the same or different;

a step of forming a second cell array having at least m×n second cells via reflective layers from a second scintillator plate;

a step of cutting the first cell array to obtain at least n first single arrays each comprising at least m×1 first cells via reflective layers;

a step of cutting the second cell array to obtain at least n second single arrays each comprising at least m×1 second cells via reflective layers;

a step of aligning each first single array and each second single array with a light-receiving element array having at least m×2 light-receiving elements, such that the first and second cells oppose the light-receiving elements; and a step of adhering the first single array and the second single array to the light-receiving element array.

In the aligning step, the first and second cells and the light-receiving elements are preferably positioned, with side surfaces of the first and second single arrays and side surfaces of the light-receiving element array abutting reference surfaces.

A jig having perpendicular flat surfaces is preferably used in the aligning step, such that the flat surfaces act as reference surfaces for positioning the first and second cells and the light-receiving elements.

Each step of forming the first and second cell arrays preferably comprises a step of fixing each scintillator plate to a support plate with an adhesive sheet;

a step of cutting each fixed scintillator plate to at least m×n cells;

a step of coating each cell with a reflective layer resin, and curing the reflective layer resin to form a resin-cured assembly; and a step of peeling the adhesive sheet from the resin-cured assembly.

The adhesive sheet preferably has a thermally-peelable adhesive layer, so that it is peeled from the resin-cured assembly by heating to 80° C. or higher.

The step of forming the resin-cured assembly preferably comprises a step of forming a frame surrounding the first and second cells, a step of fixing the frame to the support plate, and a step of pouring the reflective layer resin into a space surrounded by the frame. The frame is preferably formed by attaching adhesive sheets to side surfaces of the support plate, such that they surround the first and second cells.

When the first and second cells constituted by scintillators of different compositions have the same thickness in an X-ray irradiation direction and the same X-ray irradiation area, the first and second cells preferably have different X-ray transmittances. The X-ray transmittance is an intensity ratio of X rays passing each cell to X rays irradiated to each cell.

DESCRIPTION OF THE PREFERRED EMBODIMENTS

The embodiments of the present invention will be explained in detail below referring to the attached drawings, without intention of restricting the present invention thereto. Explanations of each embodiment are applicable to other embodiments, unless otherwise mentioned.

Figure 1:
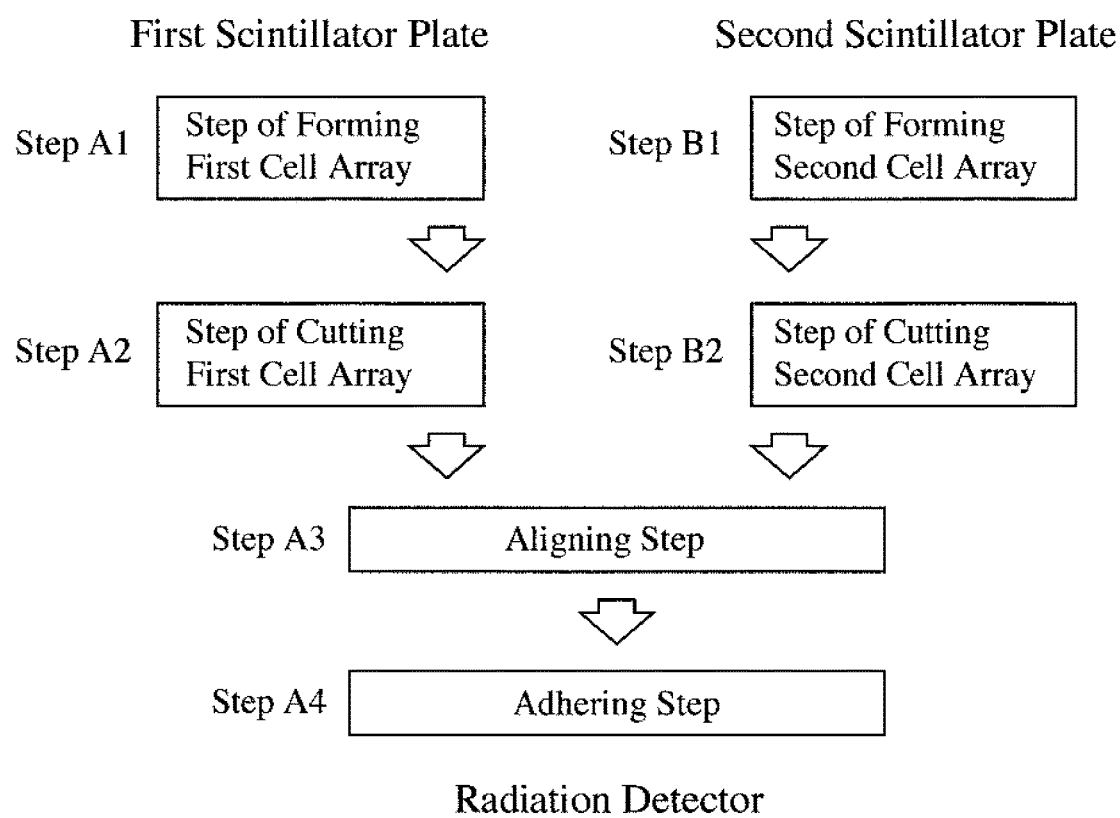
FIG. 1 is a flowchart showing the method of the present invention for producing a radiation detector.

FIG. 1 is a flowchart showing the method of the present invention for producing a dual-array radiation detector. This method comprises a step A1 of obtaining a first cell array having at least m×n first cells via reflective layers from a first scintillator plate, a step A2 of obtaining at least n first single arrays each having at least m×1 first cells via reflective layers by cutting the first cell array, a step B1 of obtaining a second cell array having at least m×n second cells via reflective layers from a second scintillator plate, a step B2 of obtaining at least n second single arrays having at least m×1 second cells via reflective layers by cutting the second cell array, a step A3 of aligning one first single array and one second single array with a light-receiving element array having at least m×2 light-receiving elements, and a step A4 of adhering the first and second single arrays to the light-receiving element array.

[1] Step A1

Figure 2:
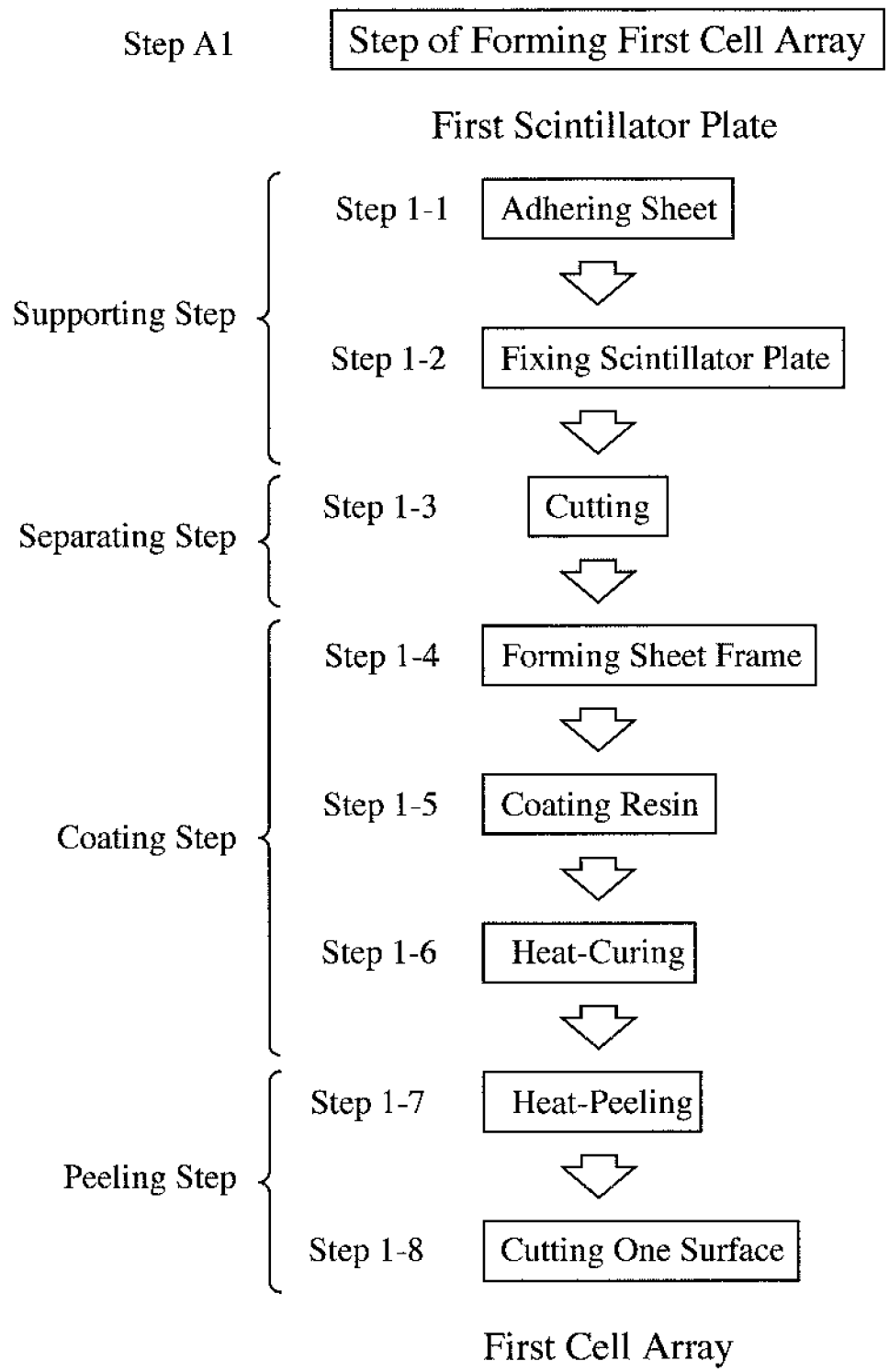
FIG. 2 is a flowchart showing a step A1 of forming a first cell array.

The step A1 of forming the first cell array comprises a step of fixing the first scintillator plate to a support plate with wax, a double-coated adhesive sheet, etc., and a step of cutting the first scintillator plate in two perpendicular directions plural times with a rotating grinder, a multi-wire saw, etc. The use of a double-coated adhesive sheet in the step A1 reduces a production cost, because it enables the efficient formation of the first cell array with a commonly usable jig. Because the use of an adhesive sheet can be conducted in both steps A1, B1, only the step A1 will be explained referring to the flowchart of FIG. 2. Of course, such explanation is applicable to the step B1.

(1) Fixing Step

Figure 3:
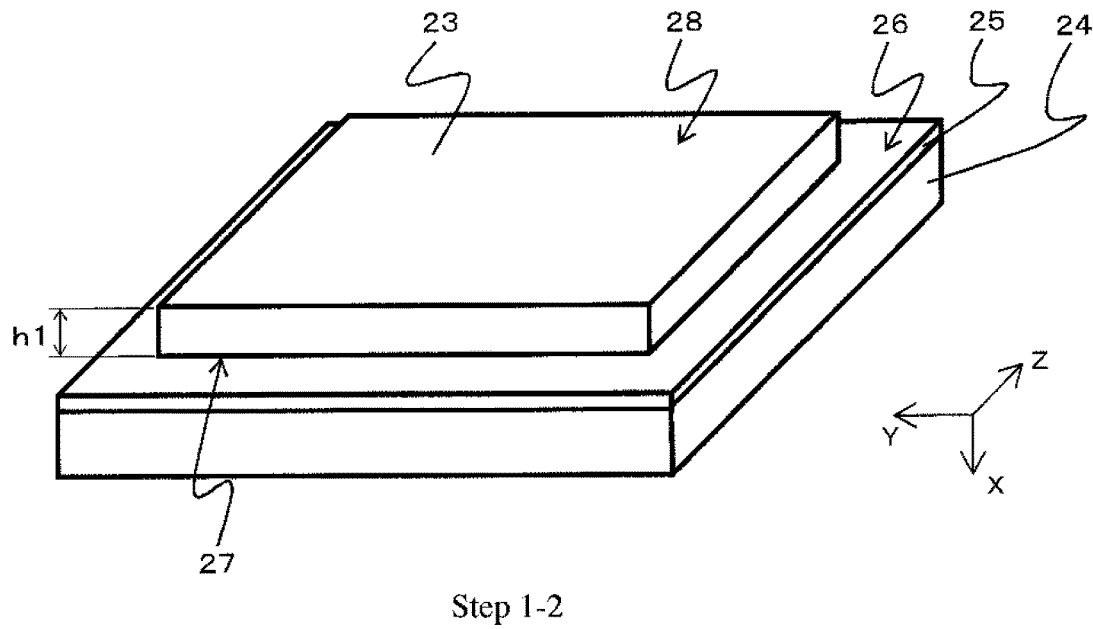
FIG. 3 is a perspective view showing a step 1-2 in the step A1 of forming the first cell array.

After a double-coated adhesive fixing sheet 25 having a separator covering each adhesive layer is cut to a size covering an upper surface of an support plate 24, one separator is peeled, and the double-coated adhesive sheet 25 is adhered to an upper surface of the support plate 24 (step 1-1). Another separator is then peeled from the adhesive fixing sheet 25 to expose an adhesive layer 26 of the adhesive fixing sheet 25, and the first scintillator plate 23 is adhered to the adhesive fixing sheet 25 with a front surface 27 of the first scintillator plate 23 below, as shown in FIG. 3 (step 1-2). Because the adhesive fixing sheet 25 having thermally-peelable adhesive layers 26 can be easily peeled by heating, it contributes to improving operation efficiency. With an adhesive layer on the side of the support plate 24 similarly thermally peelable, the adhesive fixing sheet 25 can be easily peeled from the support plate 24 by heating.

(2) Dividing Step

Figure 4:
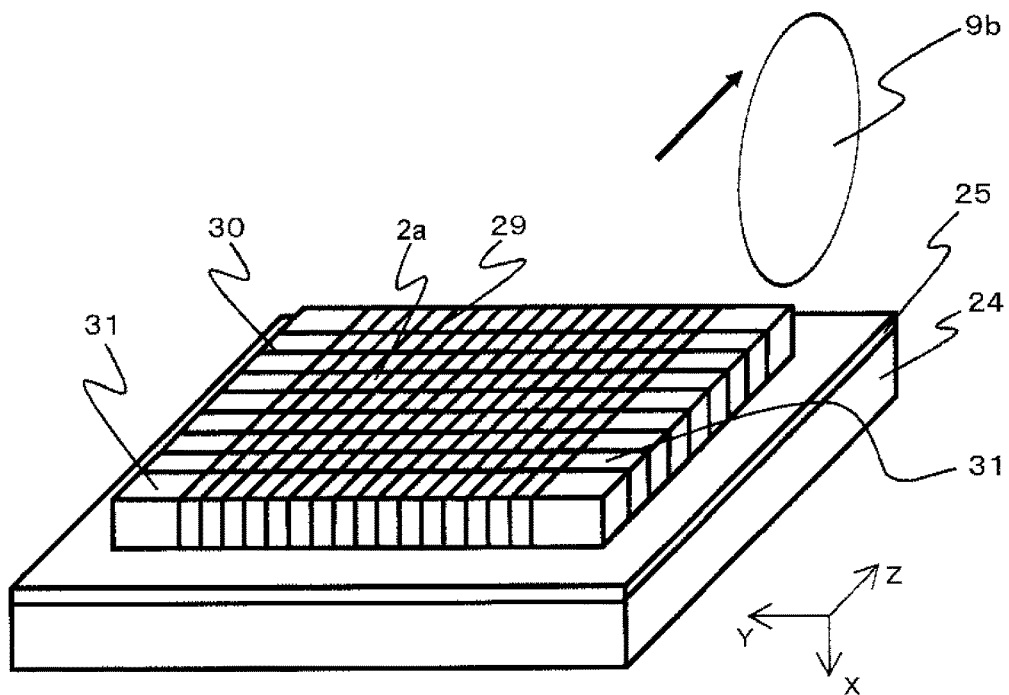
FIG. 4 is a perspective view showing a step 1-3 in the step A1 of forming the first cell array.
Figure 5:
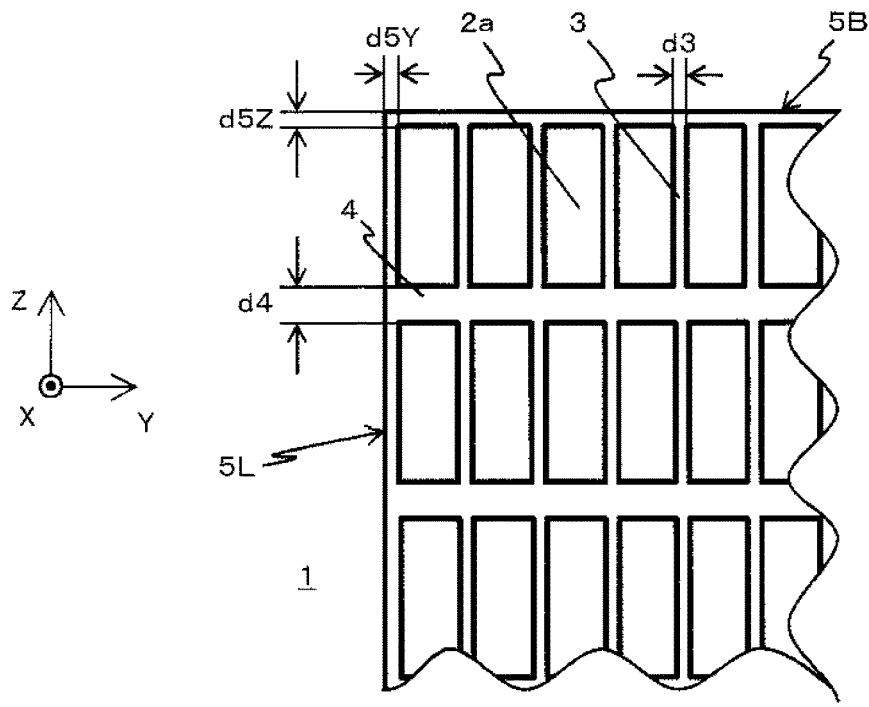
FIG. 5 is an enlarged plan view showing part of the first cell array.

As shown in FIGS. 4 and 5, the first scintillator plate 23 is cut to a width d3 (m+1) times in parallel, and to a width d4 (n+1) times in parallel in a perpendicular direction, by a rotating grinder 9b such as a diamond grinder, etc., thereby forming (m+1) parallel Z-direction cut grooves 29 and (n+1) parallel Y-direction cut grooves 30 (step 1-3). In place of the rotating grinder 9b, multi-wire saw comprising pluralities of wire saws may be used to form pluralities of cut grooves simultaneously in the first scintillator plate 23. Further, after shallow cut grooves 29, 30 are formed in the first scintillator plate 23 by the rotating grinder 9b, the first scintillator plate 23 may be fixed to the support plate 24 by an adhesive fixing sheet 25, to further cut the cut grooves 29, 30.

Figure 6:
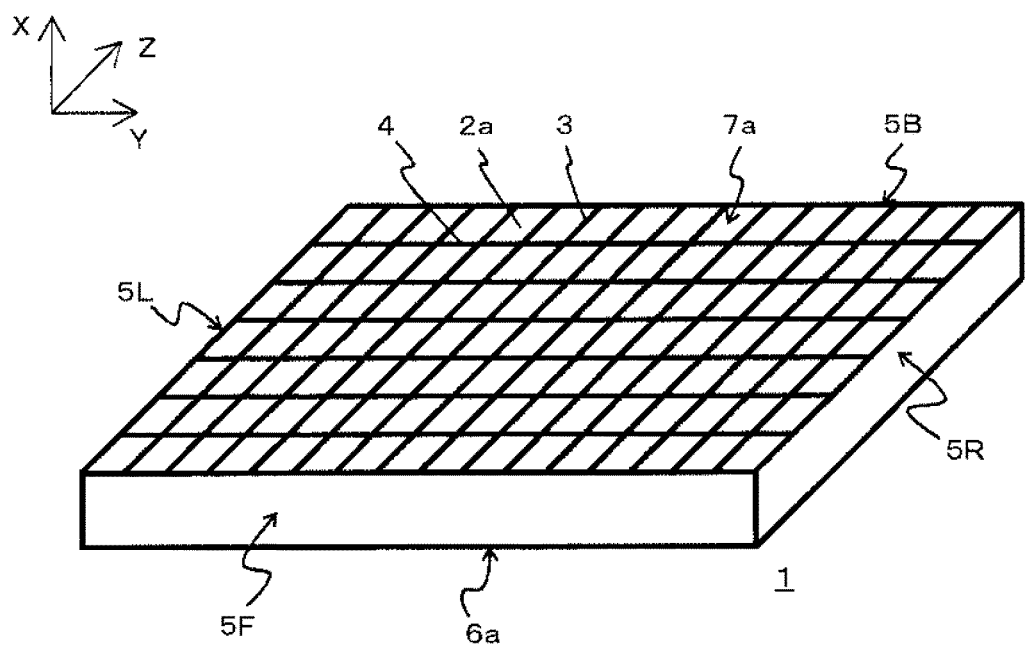
FIG. 6 is a perspective view showing the first cell array obtained in the step A1.

Because each cut groove 29, 30 is as deep as reaching the adhesive fixing sheet 25, the first scintillator plate 23 is divided to (m+2)×(n+2) first cells 2a. With edge portions removed, at least m×n first cells 2a are obtained. A first cell array 1 comprising at least m×n first cells 2a may be obtained by removing edge portions as shown in FIG. 6, or wide peripheral cells 31 may remain as shown in FIG. 4. When the peripheral cells 31 remain, m×n first cells 2a can be obtained by removing them in a subsequent step. In any case, two outside grooves among (m+1) Z-direction cut grooves 29 constitute side surfaces 5L and 5R of the first cell array 1, and two outside grooves among (n+1) Y-direction cut grooves 30 constitute side surfaces 5F and 5B of the first cell array 1.

Because each first cell 2a is fixed to the support plate 24 with an adhesive fixing sheet 25, gaps between the first cells 2a are precisely kept. After divided to the first cells 2a, they are preferably washed and dried to remove cutting chips, etc., before the coating step.

(3) Coating Step

Figure 7:
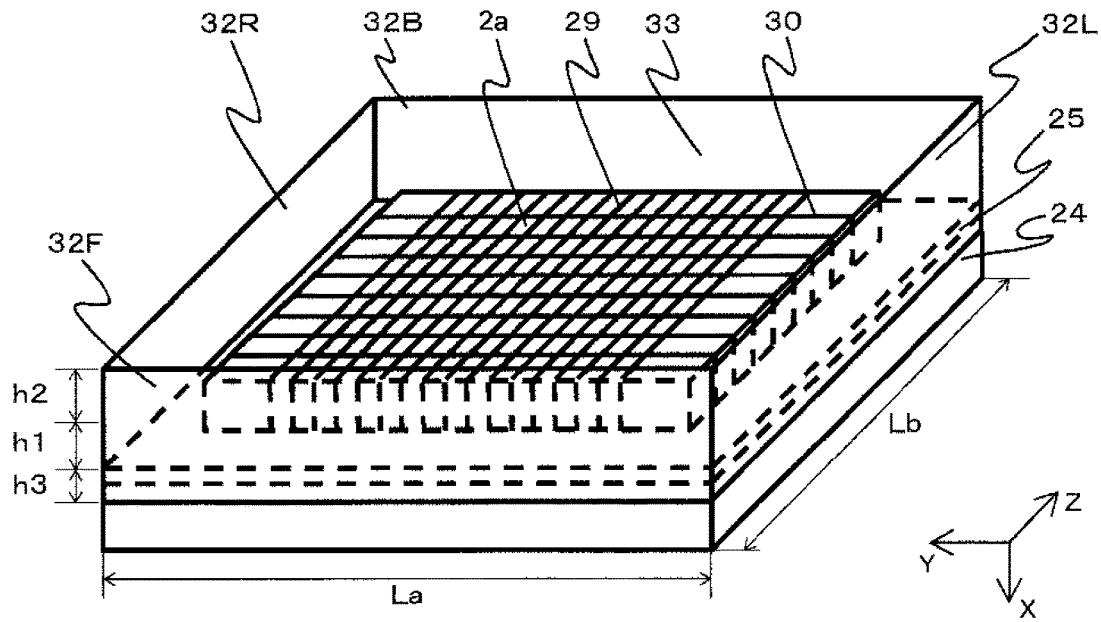
FIG. 7 is a perspective view showing a step 1-4 in the step A1 of forming the first cell array.

As shown in FIG. 7, a frame for storing a liquid resin for reflective layers is first formed (step 1-4). The frame is preferably formed by the same thermally-peelable adhesive sheet as used in the step 1-1. Each frame-forming adhesive sheet 32F, 32B has the same length as a Y-direction length La of the support plate 24, and a width equal to or larger than the total (h1+h2+h3) of the thickness h1 of the first scintillator plate, the thickness h2 of a reflective resin layer to be formed, and a margin h3 adhered to side surfaces of the support plate 24. Each frame-forming adhesive sheet 32L, 32R has the same length as a Z-direction length Lb of the support plate 24, and the same width as that of the frame-forming adhesive sheet 32F, 32B (equal to or larger than h1+h2+h3). These frame-forming adhesive sheets 32F, 32B, 32L, 32R are adhered to side surfaces of the support plate 24 such that they surround the first cells 2a. With all thermally-peelable adhesive layers of the frame-forming adhesive sheets 32F, 32B, 32L, 32R inside, their adhesion to and heat-peeling from the support plate 24 are easy. Of course, double-coated, thermally-peelable adhesive sheets may be used for the frame.

The frame-forming adhesive sheets 32F, 32B, 32L, 32R adhered to the side surfaces of support plate 24 are adhered to each other in their end portions to form a rectangular frame. A space surrounded by the adhesive fixing sheet 25 may be regarded as a container having an opening 33. As another method for forming a container, end portions of the frame-forming adhesive sheets 32F, 32B, 32L, 32R may be adhered to form a frame, which is adhered to the side surfaces of support plate 24. Further, a frame made of a resin such as fluororesin, etc. easily peelable from the reflective layer resin may be adhered to the side surfaces of support plate 24, thereby forming a container.

A liquid resin for reflective layers is then poured into the container surrounded by the frame-forming adhesive sheets 32F, 32B, 32L, 32R (step 1-5). The reflective layer resin enter all gaps 29, 30 between the first cells 2a, and covers upper and side surfaces of the first cell array 1, thereby obtaining the first cells 2a coated with the reflective layer resin. The liquid resin for reflective layers is gently poured over a long period of time to have a resin layer with uniform thickness.

The reflective layer resin filling gaps between the first cells 2a is cured to obtain a first cell array 1 integrally comprising m×n first cells 2a. The same reflective layer resin is coated to side surfaces 5F, 5L, 5R and 5B and rear surface 6a of the first cell array 1, and then cured. Accordingly, only a front surface 7a of the first cell array 1 is not covered with the reflective layer resin, permitting the first cells 2a to be exposed therefrom. As the reflective layer resin, a mixture of a thermosetting resin with fine titanium oxide particles is preferable. Incidentally, a cured reflective resin plate may be used as the support plate.

A reflective resin filling gaps between m first cells 2a aligned in a Y direction constitutes reflective layers 3, and a reflective resin filling gaps between n first cells 2a aligned in a Z direction constitutes cutting margin layers 4. Accordingly, m×n first cells 2a are made integral by the reflective layers 3 and the cutting margin layers 4. In FIG. 6, the reflective layers 3 and the cutting margin layers 4 are shown by straight lines for simplicity.

FIG. 5 enlargedly shows part of a front surface 7a of the first cell array 1. The first cells 2a are aligned in a Y direction via reflective layers 3 each having a thickness d3, and in a Z direction via cutting margin layers 4 each having a thickness d4. A reflective layer resin covering a side surface 5L (corresponding to Y-direction end surfaces of the first cells 2a) of the first cell array 1 has a thickness d5Y, and a reflective layer resin covering a side surface 5B (corresponding to Z-direction end surfaces of the first cells 2a) of the first cell array 1 has a thickness d5Z.

After the resin-coating step, the reflective layer resin is cured by heating to the heat-curing temperature of the resin by a first heating apparatus (step 1-6). By curing the reflective layer resin, at least m×n first cells 2a are integrated. The reflective layer resin is preferably a mixture of a liquid thermosetting resin with titanium oxide fine particles. In the case of an epoxy resin, for example, the heat-curing time is preferably 1-6 hours.

(4) Peeling Step

After the reflective layer resin is cured by the first heating apparatus, the frame-forming adhesive sheets 32F, 32B, 32L, 32R and the adhesive fixing sheet 25 are peeled to obtain a resin-cured assembly (step 1-7). The cured resin constitutes reflective layers. The adhesive fixing sheet 25 and the frame-forming adhesive sheets 32F, 32B, 32L, 32R having thermally-peelable adhesive layers are easily peelable with reduced adhesion, by heating to the curing temperature of the reflective resin or higher (for example, 80° C. or higher) by a second heating apparatus such as a hot plate, etc.

Because the adhesive fixing sheet 25 is fully adhered to the first cells 2a before the heat-curing of the reflective resin, the reflective resin does not enter their gaps. Accordingly, one surface of each first cell 2a is exposed to a front surface of the resin-cured assembly obtained through the heat-curing step and the heat-peeling step, but all surfaces other than the front surfaces of the first cells 2a are covered with the reflective layers.

Figure 8:
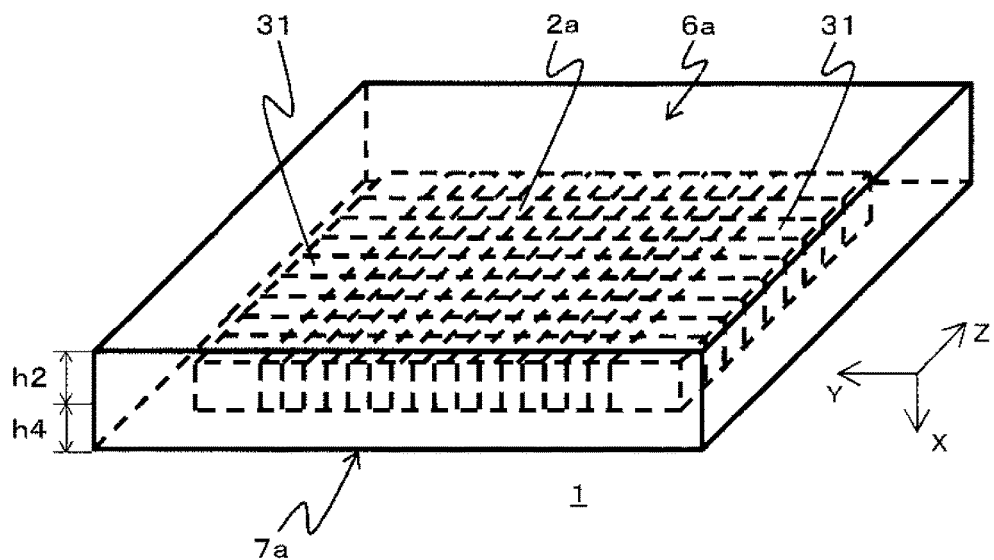
FIG. 8 is a perspective view showing the first cell array obtained in a step 1-8 in the step A1 of forming the first cell array.

As shown in FIG. 8, a front surface 7a of the resin-cured assembly is cut flat until the first cells 2a have a thickness h4, obtaining a first cell array 1 comprising at least m×n first cells 2a (step 1-8). After cutting the front surface 7a, a rear surface of the resin-cured assembly is preferably cut until the reflective layer has a thickness h2. Because the first cell array 1 comprise peripheral cells 31 as shown in FIG. 8, the peripheral cells 31 are cut off in a step A2 after the one-side cutting.

[2] Step A2

Figure 9:
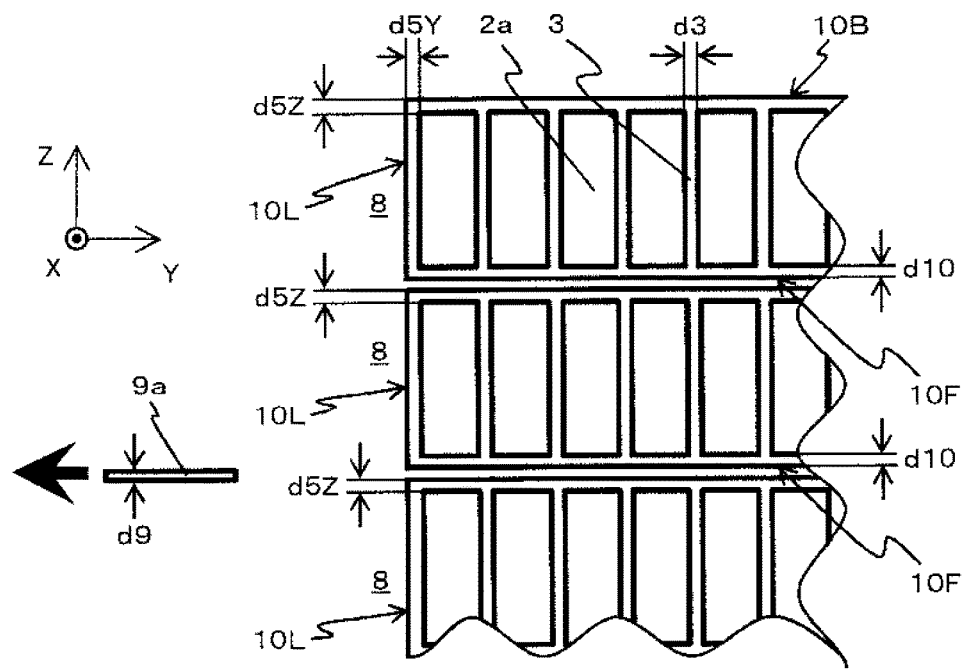
FIG. 9 is an enlarged plan view showing the same portion as in FIG. 5 after a step A2 is conducted.

FIGS. 4 and 9 show a step of cutting the first cell array 1 along the cutting margin layers 4 by a rotating grinder 9a, etc. The cutting margin layers 4 remaining on the side surfaces of the first cells 2a after cutting constitute reflective layers each having a thickness d5Z. Thus obtained is a first single array 8 comprising at least m×1 cells 2a aligned in a Y direction via reflective layers 3 each having a thickness d3, and reflective layers each having a thickness d5Z on both Z-direction side surfaces 10B, 10F. The cutting of the second and subsequent rows are similarly conducted to obtain at least n first single arrays 8 in total. A method for obtaining at least n first single arrays 8 by cutting the first cell array 1 is more efficient than a method of obtaining individual first single arrays 8.

A reflective layer on the side surface 10L of the first single array 8 has the same thickness d5Y as that of reflective layers on the side surface 5L of the first cell array 1. When there are reflective resin layers thicker than d5Y, d5Z on the side surfaces 5F, 5L, 5B and 5R of the first cell array 1, or when the first cell array 1 comprises more first cells 2a than m×n, cutting necessary for obtaining the first single arrays 8 with the above structure may be conducted in the step A2. Also, the cutting margin layer 4 may have a sufficiently larger thickness d4 than the thickness d9 of the rotating grinder 9a, such that a reflective resin layer having a larger thickness [=(d4−d9)/2] than d10 remains on the side surface 10F of the first single array 8, and the reflective layer on the side surface 10F may be cut again to a precise thickness d10.

[3] Steps B1 and B2

The steps B1 and B2 are the same as the steps A1 and A2, except that a second scintillator plate having a different composition is used in place of the first scintillator plate. It is preferable to properly set the Z-direction thickness of cells in the first single array obtained in the step A2 and in the second single array obtained in the step B2, to adjust their X-ray absorbances different by compositions. In the depicted example, the second scintillator plate is thicker than the first scintillator plate, and the second scintillator has higher X-ray absorbance than that of the first scintillator in the same thickness and area, though not restrictive of course.

[4] Steps A3 and A4

Figure 10:
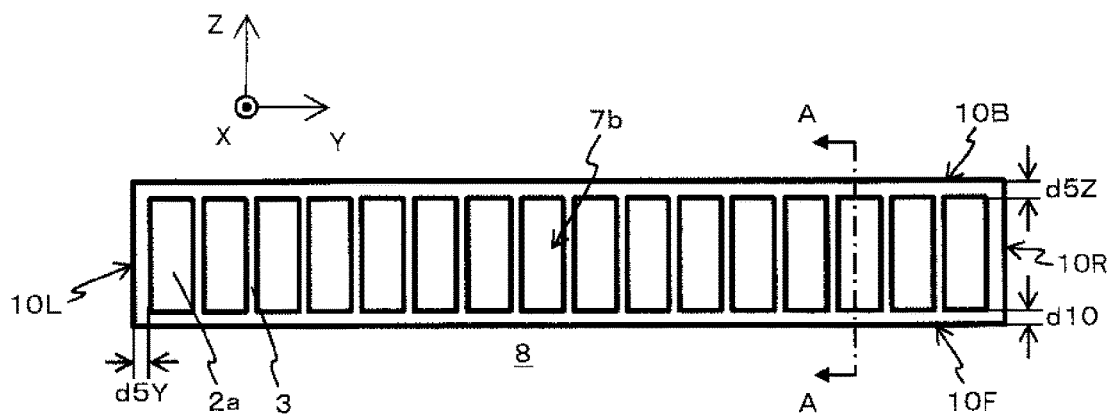
FIG. 10 is a plan view showing a first single array to be positioned in a step A3.
Figure 11:
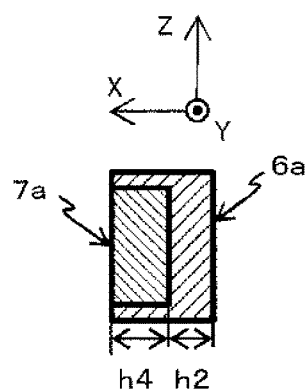
FIG. 11 is a cross-sectional view taken along the line A-A in FIG. 10.

The first and second single arrays and the light-receiving element array are aligned, such that their cells are precisely aligned with the light-receiving elements. FIGS. 10 and 11 show the first single array 8, FIGS. 12 and 13 show the second single array 11, and FIG. 14 shows the light-receiving element array 12.

As shown in FIGS. 10 and 11, the first single array 8 integrally comprises at least m first cells 2a via reflective layers 3, with other surfaces (side surfaces 10B, 10L, 10R, 10F, and rear surface 6b) than the front surface 7b covered with a reflective resin. The thickness of the reflective layer is d5Y on the side surfaces 10L, 10R, d5Z on the side surface 10B, d10 on the side surface 10F, and h2 on the rear surface 6b. The first cells 2a have an X-direction thickness h4.

Figure 12:
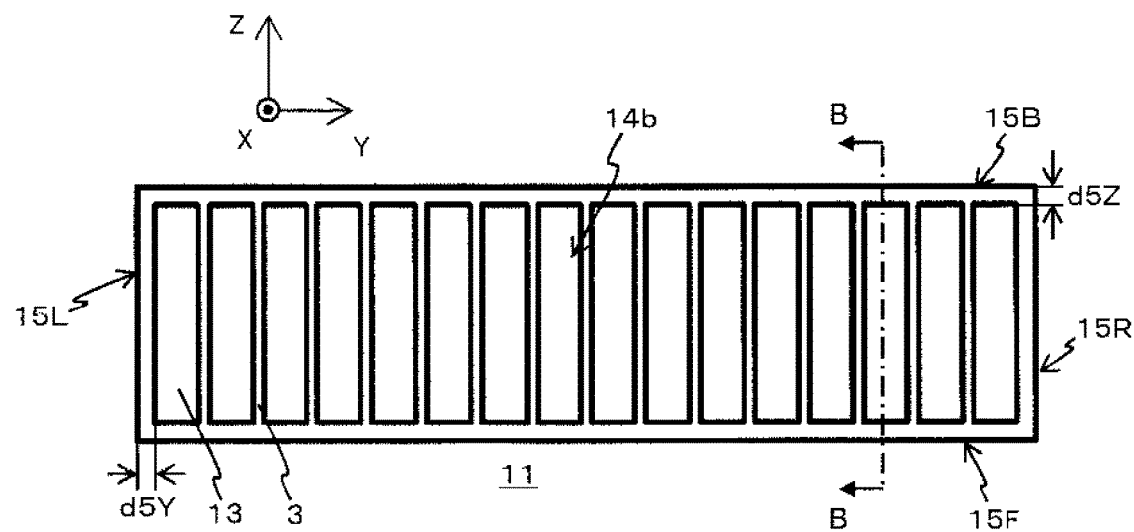
FIG. 12 is a plan view showing a second single array to be positioned in a step A3.
Figure 13:
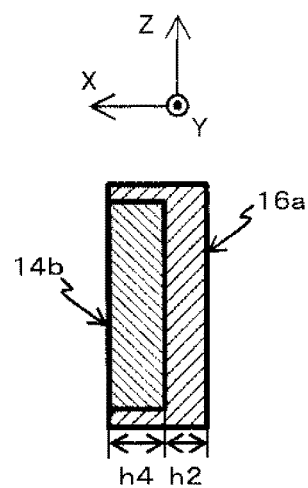
FIG. 13 is a cross-sectional view taken along the line B-B in FIG. 12.
Figure 14:
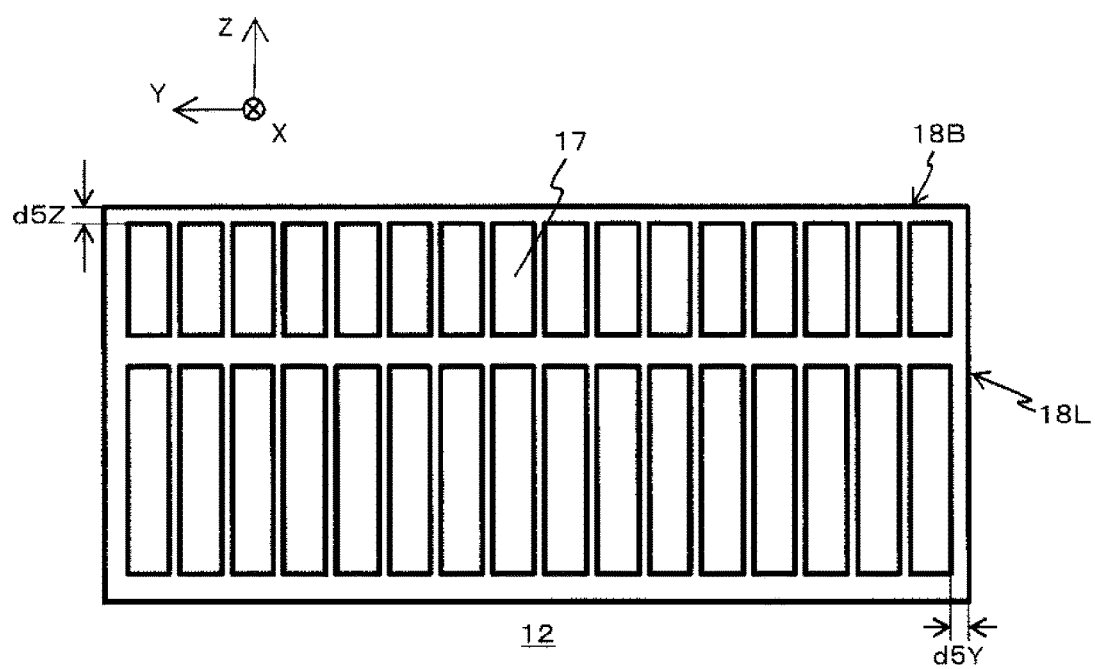
FIG. 14 is a plan view showing a light-receiving element array to be positioned in a step A3.

As shown in FIGS. 12 and 13, the second single array 11 integrally comprises at least m second cells 13 via reflective layers 3, with other surfaces (side surfaces 15B, 15L, 15R, 15F, and rear surface 16b) than the front surface 14b covered with a reflective resin. The thickness of the reflective layer is d5Y on the side surfaces 15L, 15R, d5Z on the side surface 15B, and h2 on the rear surface 16b. The second cells 13 have an X-direction thickness h4.

In the depicted example, the Z-direction length of the first cells 2a is smaller than that of the second cells 13, though not restrictive. In FIGS. 10-14, m=16, though not restrictive of course, and m may be an arbitrary natural number of 2 or more.

As shown in FIG. 14, the light-receiving element array 12 comprises at least m×2 light-receiving elements 17 aligned at a pitch corresponding to the first and second cells 2a, 13. A gap between the side surface 18L of the light-receiving element array 12 and the closest light-receiving element 17 is d5Y, and a gap between the side surface 18B of the light-receiving element array 12 and the closest light-receiving element 17 is d5Z. As the light-receiving element array 12, for example, a silicon photodiode formed by photolithography can be used. Because a silicon photodiode comprises precisely aligned light-receiving elements 17, it can be easily aligned with the first and second cells 2a, 13 in the aligning step A3. For simplicity, only at least m×2 light-receiving elements 17 are shown in FIGS. 14, 15 and 16, with wires, terminals, etc. of the light-receiving element array 12 omitted.

(1) First Positioning Method

The first precise positioning method uses an X reference surface for X-direction positioning, a Y reference surface for Y-direction positioning, and a Z reference surface for Z-direction positioning. In this method, (a) the first cells 2a of the first single array 8 shown in FIGS. 10 and 11, the second cells 13 of the second single array 11 shown in FIGS. 12 and 13, and the light-receiving elements 17 of the light-receiving element array 12 are positioned in Y and Z directions (step A3), and (b) the first cells 2a, the second cells 13 and the light-receiving elements 17 are then positioned in an X direction in the step of adhering them (step A4).

Figure 15:
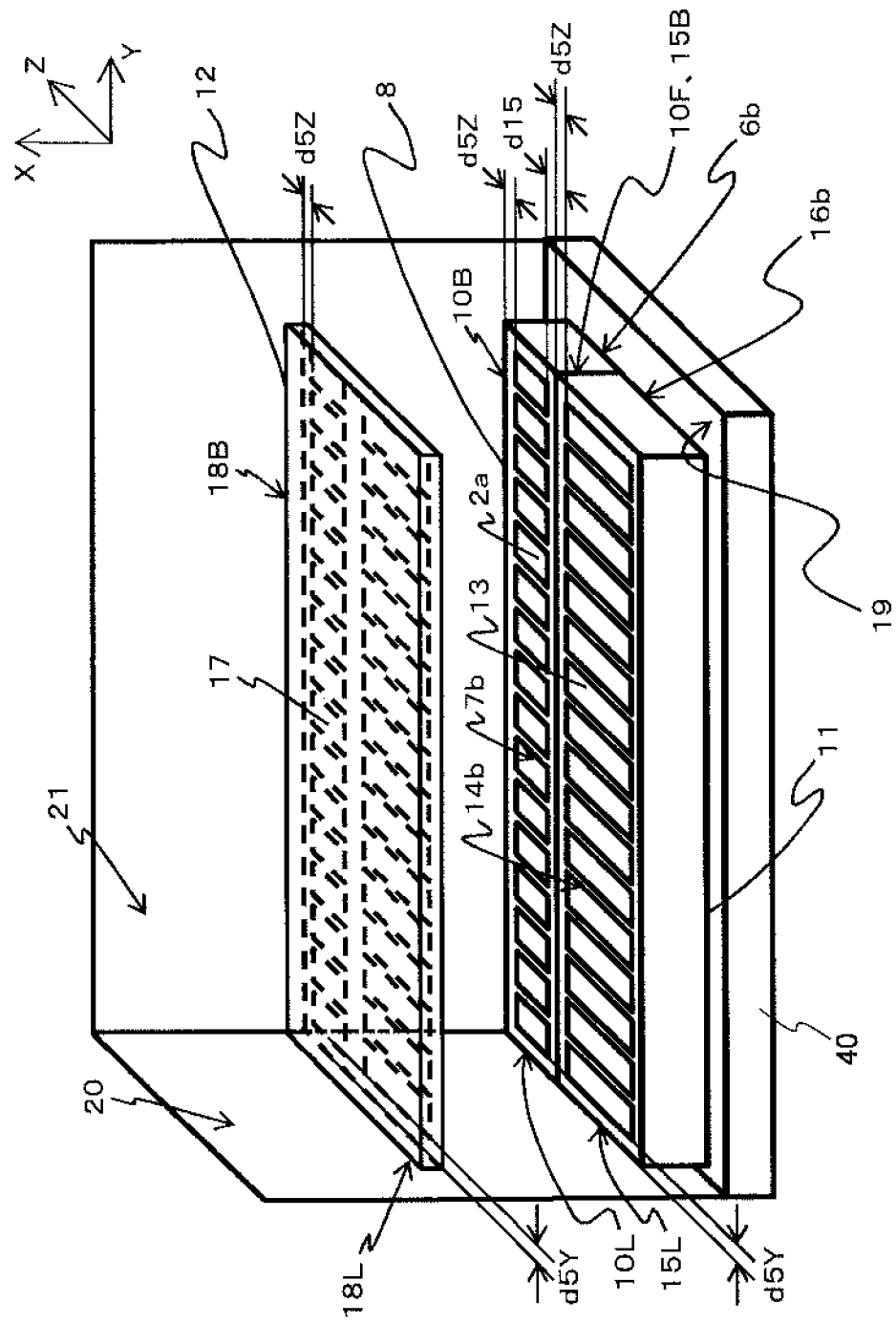
FIG. 15 is a perspective view showing a first method for positioning the first and second cell arrays and the light-receiving element array in the step A3.
Figure 16:
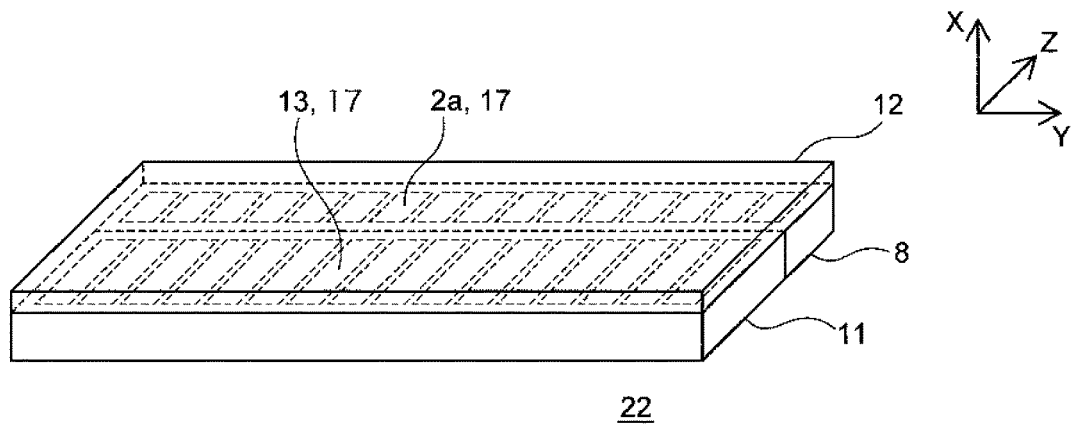
FIG. 16 is a perspective view showing a radiation detector produced by the method of the present invention.

FIG. 15 shows a method for positioning the first single array 8 and the second single array 11 in X, Y and Z directions, and positioning the light-receiving element array 12 in Y and Z directions, using the X-reference surface 19, the Y reference surface 20 and the Z reference surface 21 perpendicular to each other. The X-reference surface 19 is preferably constituted by an upper surface of a flat support plate 40, and the Y reference surface 20 and the Z reference surface 21 are preferably constituted by right-angled inside surfaces of an L-shaped metal plate.

Figure 17A:
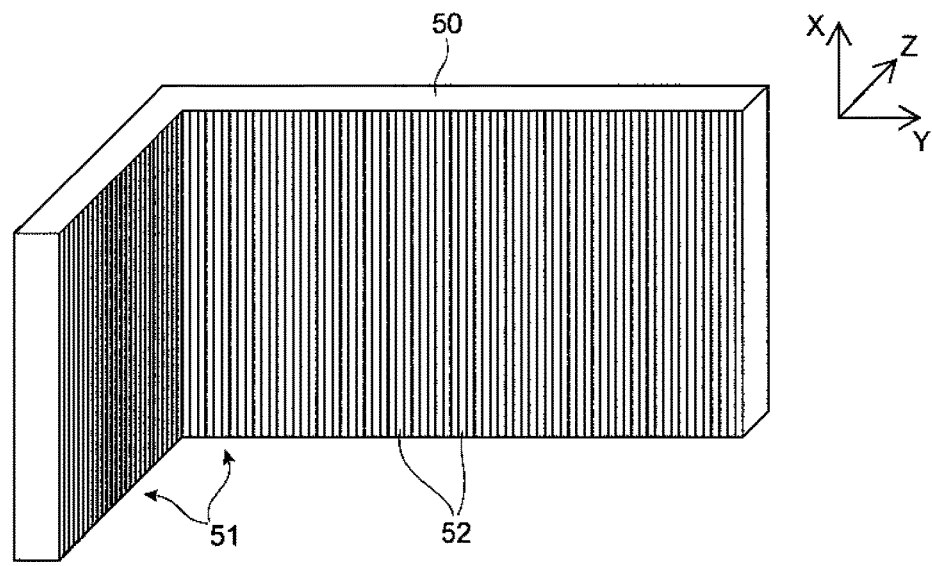
FIG. 17(a) is a perspective view showing an L-shaped metal plate having a Y reference surface and a Z reference surface, as well as vertical grooves formed on inside surfaces with equal intervals.
Figure 17B:
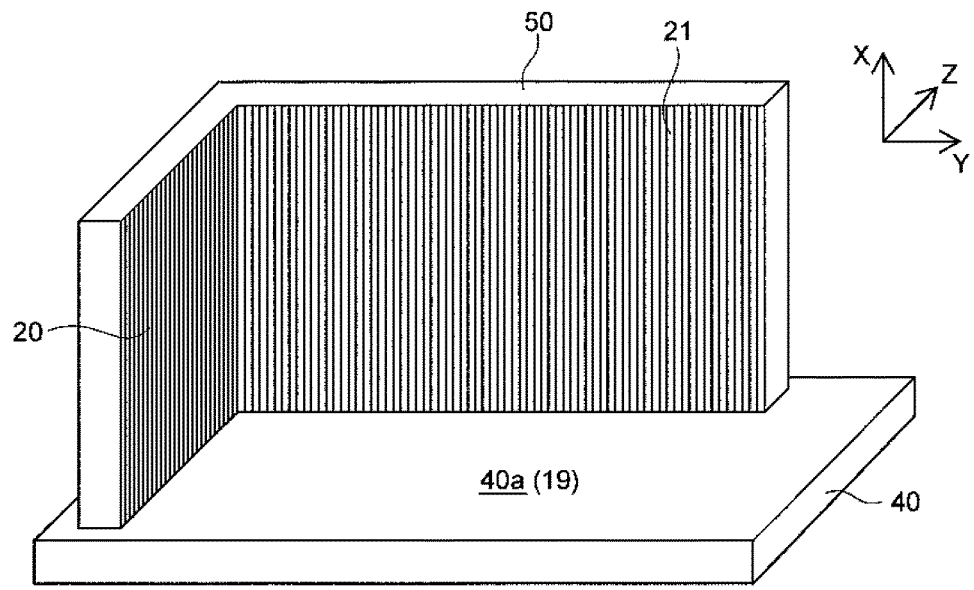
FIG. 17(b) is a perspective view showing the L-shaped metal plate placed on an upper surface of a support plate.

To make the Y reference surface 20 and the Z reference surface 21 perpendicular to the X-reference surface 19 easily, it is preferable to use an L-shaped metal plate 50 constituted by integrally connected perpendicular metal plates, which has a size sufficiently covering the first and second single arrays 8, 11 and the light-receiving element array 12, as shown in FIG. 17(a). As shown in FIG. 17(b), with the L-shaped metal plate 50 placed on the upper surface 40(a) of the support plate 40 constituting the X-reference surface 19, the X-reference surface 19, the Y reference surface 20 and the Z reference surface 21 perpendicular to each other can be obtained precisely and easily. To keep a right angle between the Y reference surface 20 and the Z reference surface 21 surely, the L-shaped metal plate 50 is formed preferably by bending a relatively thick metal plate, or by carving a metal block. Particularly preferable is carving, because it provides a precise right angle and high jig strength at low cost.

First, the first single array 8 and the second single array 11 are placed on the X-reference surface 19. With the side surface 10F of the first single array 8 in contact with the side surface 15B of the second single array 11 on the X-reference surface 19, a Z-direction gap between the first cells 2a and the second cells 13 is precisely set to d15 (=d10+d5Z). In FIG. 15, an abutting interface of the side surfaces 10F and 15B is shown by "10F, 15B."

With the side surface 10L of the first single array 8 and the side surface 15L of the second single array 11 abutting the Y reference surface 20 while keeping contact with the X-reference surface 19, the first and second cells 2a, 13 are precisely positioned in a Y direction. Further, with the side surface 10B of the first single array 8 abutting the Z reference surface 21, the first and second cells 2a, 13 are precisely aligned with the light-receiving elements 17.

With the side surfaces 18L and 18B of the light-receiving element array 12 abutting the Y reference surface 20 and the Z reference surface 21, respectively, in the arrangement of the light-receiving element array 12 opposing the first and second single arrays 8, 11, the light-receiving element array 12 can be positioned in Y and Z directions such that the light-receiving elements 17 precisely oppose the first and second cells 2a, 13.

With the front surface 7b of the first single array 8, the front surface 14b of the second single array 11, and a surface of the light-receiving element array 12 on the side of the light-receiving elements 17 coated with an optical adhesive resin, the light-receiving element array 12 is adhered to the first and second single arrays 8, 11, while keeping abutment to the X-reference surface 19, the Y reference surface 20 and the Z reference surface 21 (step A4). Of course, after the light-receiving element array 12 is adhered to the first and second single arrays 8, 11, their positions may be finely adjusted.

The optical adhesive resin is preferably applied to a uniform thickness while avoiding bubbles. When the first and second single arrays 8, 11 are adhered to the light-receiving element array 12 with a slightly excessive adhesive to avoid bubbles, an excessive portion of the adhesive overflows from the adhesion interface. Accordingly, the X-reference surface 19, the Y reference surface 20 and the Z reference surface 21 are preferably coated with a parting agent, such that they are easily detached after adhesion.

Figure 17C:
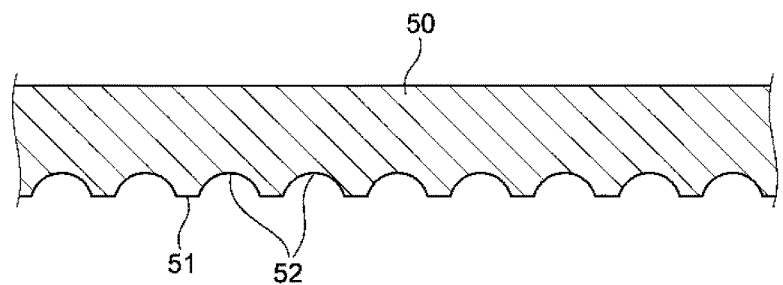
FIG. 17(c) is a partial cross-sectional view showing vertical grooves formed on an inside surface of the L-shaped metal plate with equal intervals.
Figure 18:
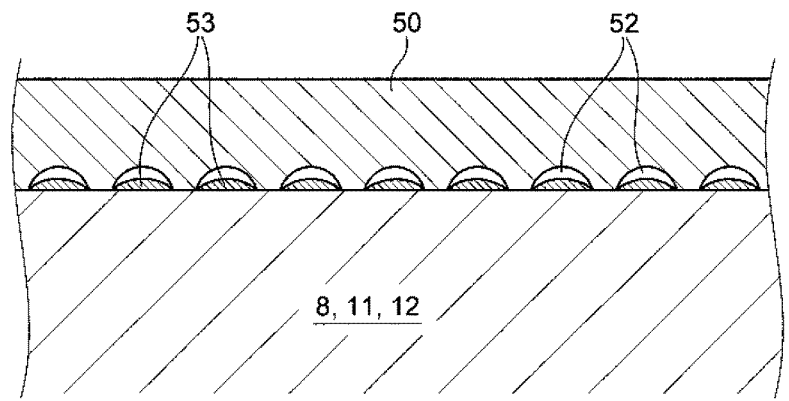
FIG. 18 is a partial cross-sectional view showing the single arrays and the light-receiving element array closely attached to the L-shaped metal plate having vertical grooves.
Figure 19A:
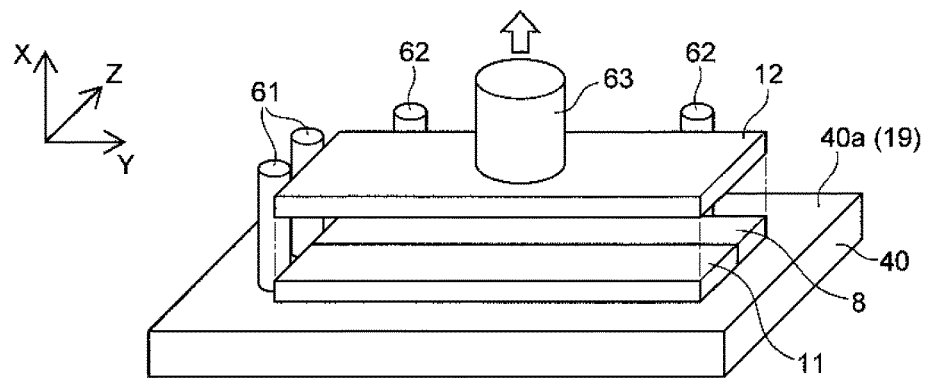
FIG. 19(a) is a perspective view showing a second method for positioning the first and second cell arrays and the light-receiving element array in the step A3.
Figure 19B:
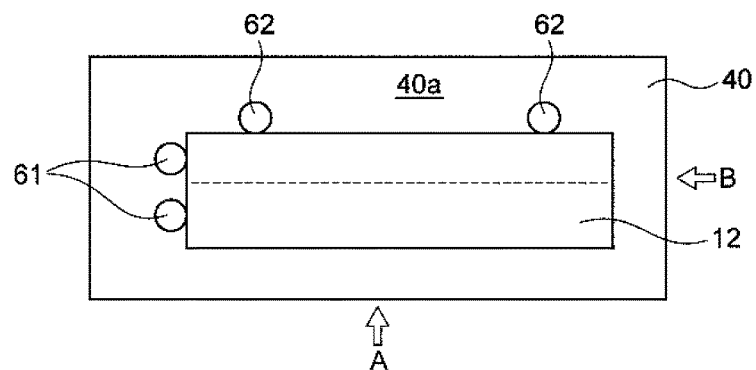
FIG. 19(b) is a plan view showing the first and second cell arrays and the light-receiving element array positioned by the second method.
Figure 19C:
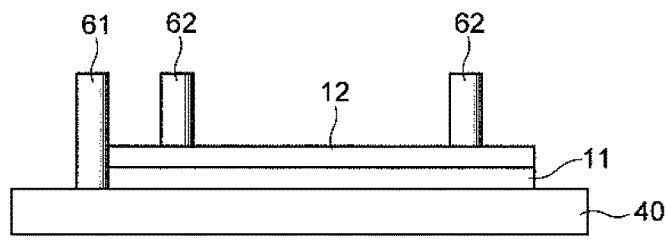
FIG. 19(c) is a side view when viewed in a direction A in FIG. 19(b).
Figure 19D:
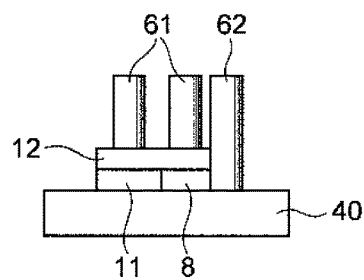
FIG. 19(d) is a side view when viewed in a direction B in FIG. 19(b).

If an adhesive overflowing from the adhesion interfaces were not surely removed from interfaces between the reference surfaces 19, 20, 21 and the first and second single arrays 8, 11 and the light-receiving element array 12, their positioning precision would be lowered. Accordingly, as shown in FIGS. 17(a) and 17(c), the inside surfaces 51 of the L-shaped metal plate 50 are preferably provided with pluralities of vertical grooves 52 with equal intervals. When the first and second single arrays 8, 11 and the light-receiving element array 12 are attached to the L-shaped metal plate 50 having grooves 52 as shown in FIG. 18, an overflown adhesive 53 enters grooves 52, making it possible to carry out the precise positioning of the first and second single arrays 8, 11 and the light-receiving element array 12, without expanding gaps between the inside surfaces 51 of the L-shaped metal plate 50 and the side surfaces of the first and second single arrays 8, 11.

In the radiation detector 22 thus obtained, as schematically shown in FIG. 16, each of the first and second cells 2a, 13 is opposing each light-receiving elements 17. Adhesion interfaces between the first and second cells 2a, 13 and the light-receiving elements 17 are shown by dotted lines, those between the first cells 2a and the light-receiving elements 17 being shown by "2a, 17," and those between the second cells 13 and the light-receiving elements 17 being shown by "13, 17." Light emitted from the first and second cells 2a, 13 by Z-direction radiation enters the light-receiving elements 17, in which it is converted to radiation detection signals.

A surface smoothly movable in an X direction may be added while keeping abutment to the Y reference surface 20 and the Z reference surface 21. This movable surface is perpendicular to the Y reference surface 20 and the Z reference surface 21, and parallel to the X-reference surface 19. With air suction holes provided in the X-reference surface 19 and the movable surface, the positioned first and second single arrays 8, 11 and light-receiving element array 12 can be fixed, resulting in improved operation efficiency.

(2) Second Positioning Method

As shown in FIGS. 19(a)-19(d), the second positioning method uses vertical cylindrical poles 61, 62 in place of the Y reference surface 20 and the Z reference surface 21, to carry out the positioning of the side surfaces of the first and second single arrays 8, 11 and the light-receiving element array 12. The X-reference surface 19 is constituted by an upper surface 40a of a flat support plate 40. With at least three vertical poles 61, 62 standing on the flat upper surface 40a of the support plate 40, the precise positioning of the first and second single arrays 8, 11 and the light-receiving element array 12 can be achieved as in the first positioning method. In this case, too, with air suction holes (not shown) provided in the X-reference surface 19, the positioned first and second single arrays 8, 11 and light-receiving element array 12 can be fixed. Also, by conveying the light-receiving element array 12 with a suction-type air nozzle 63, positioning and adhesion can be automated.

(3) Third Positioning Method

Figure 20A:
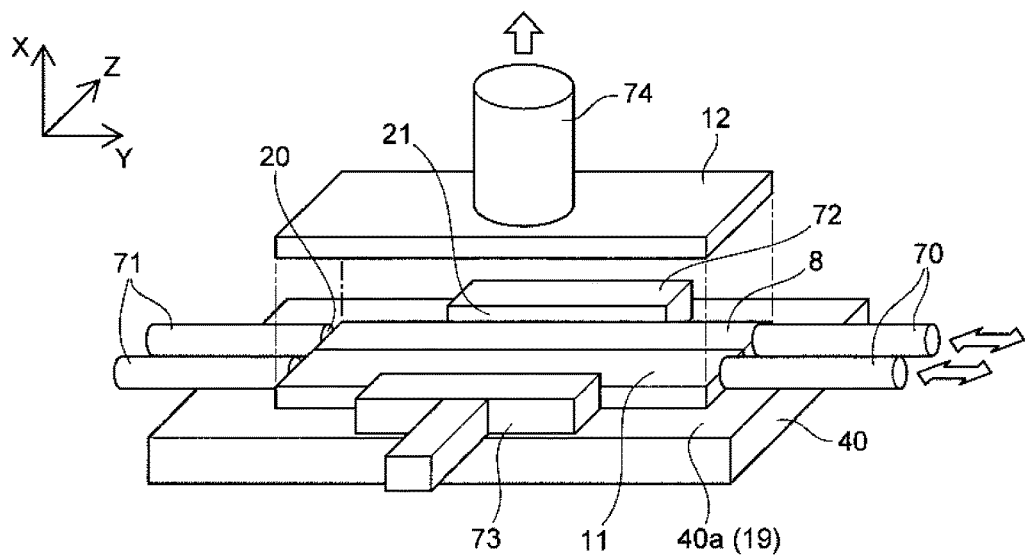
FIG. 20(a) is a perspective view showing a third method for positioning the first and second cell arrays and the light-receiving element array in the step A3.
Figure 20B:
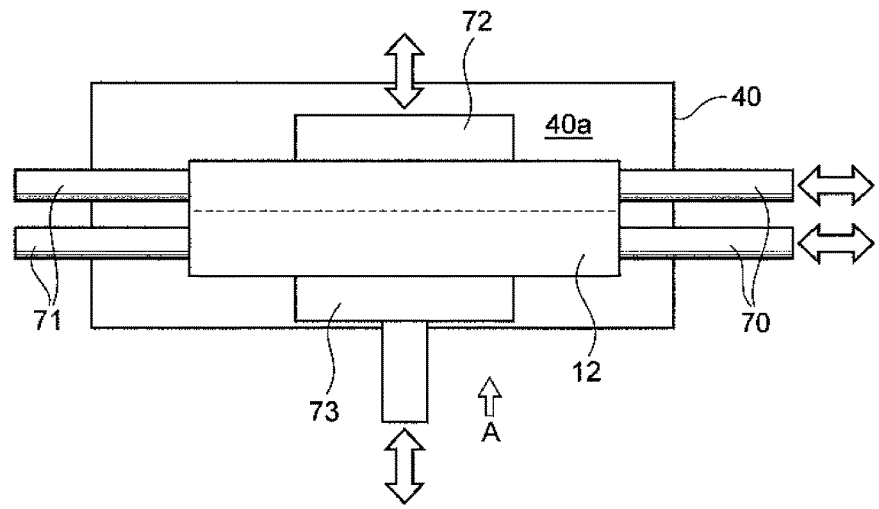
FIG. 20(b) is a plan view showing the first and second cell arrays and the light-receiving element array positioned by the third method.
Figure 20C:
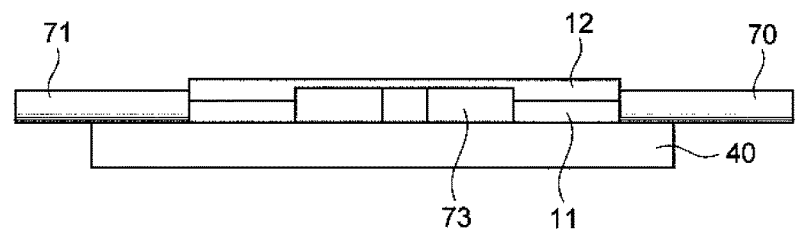
FIG. 20(c) is a side view when viewed in a direction A in FIG. 20(b).

FIGS. 20(a)-20(c) show the third method using a flat support plate 40 having an upper surface 40a (X-reference surface 19), pushing rods 70, 71 each having a tip end surface acting as a Y reference surface 20, and pushing blocks 72, 73 each having a tip end surface acting as a Z reference surface 21, to carry out the positioning of the first and second single arrays 8, 11 and the light-receiving element array 12. In this method, the first and second single arrays 8, 11 are temporarily fixed to the support plate 40 by suction, etc. To avoid foreign matter, etc. from intruding between the first and second single arrays 8, 11 and the support plate 40 to hinder precise positioning, the first and second single arrays 8, 11 are preferably suctioned after removing foreign matter, etc. by compressed air blown from an air nozzle. With suction, the first and second single arrays 8, 11 can be fixed at highly precise positions.

After the first and second single arrays 8, 11 are temporarily fixed, their Y-direction and Z-direction positions are finely adjusted by the pushing rods 70, 71 and the pushing blocks 72, 73. One or a pair of pushing rods 70, 71 and pushing blocks 72, 73 may be used for each side surface. The pushing rods 71 on one Y-direction side surface may be used as a reference surface, with the pushing rods 70 on the other Y-direction side surface movable. Similarly, the pushing block 72 on one Z-direction side surface may be used as a reference surface, with the pushing block 73 on the other Z-direction side surface movable.

After fine position adjustment of the first and second single arrays 8, 11, the light-receiving element array 12 coated with an optical adhesive resin is conveyed by a suction nozzle 74, and then adhered to the first and second single arrays 8, 11 to form a radiation detector. After removing the pushing rods 70, 71 and the pushing blocks 72, 73, suction is stopped, and the resultant radiation detector is conveyed by a suction nozzle 74 to a tray, etc. for subsequent treatments. Conveyance by a suction nozzle 74 enables continuous operations suitable for mass production.

(4) Fourth Positioning Method

Figure 21A:
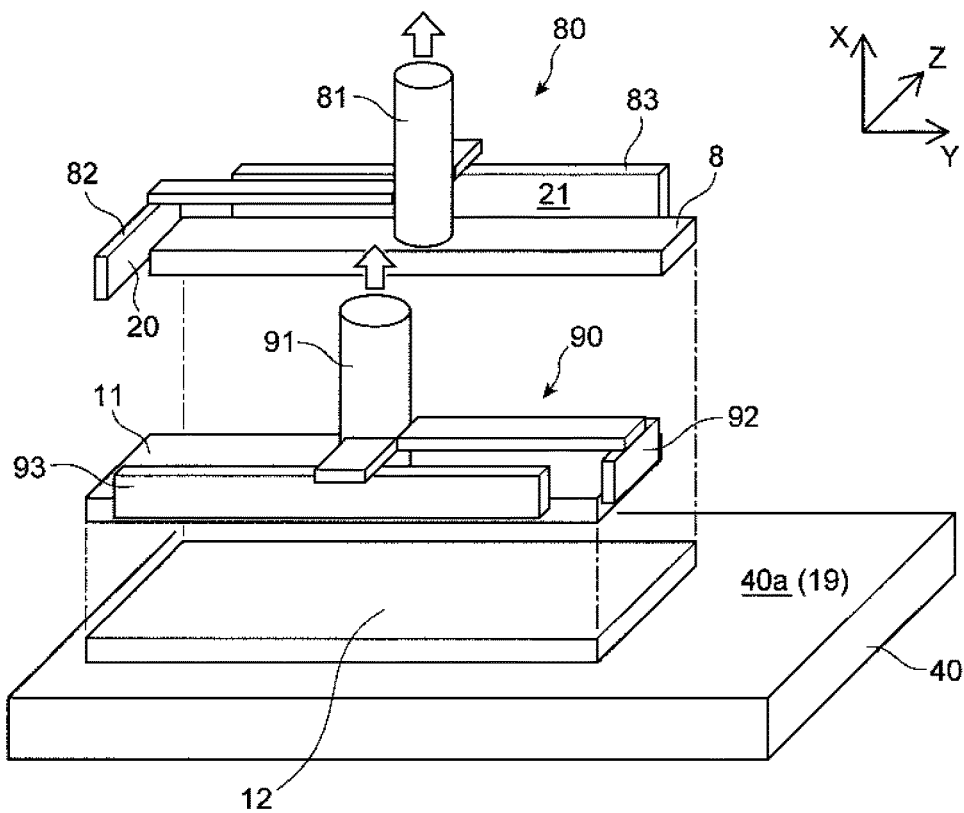
FIG. 21(a) is an exploded perspective view showing a fourth method for positioning the first and second cell arrays and the light-receiving element array in the step A3.
Figure 21B:
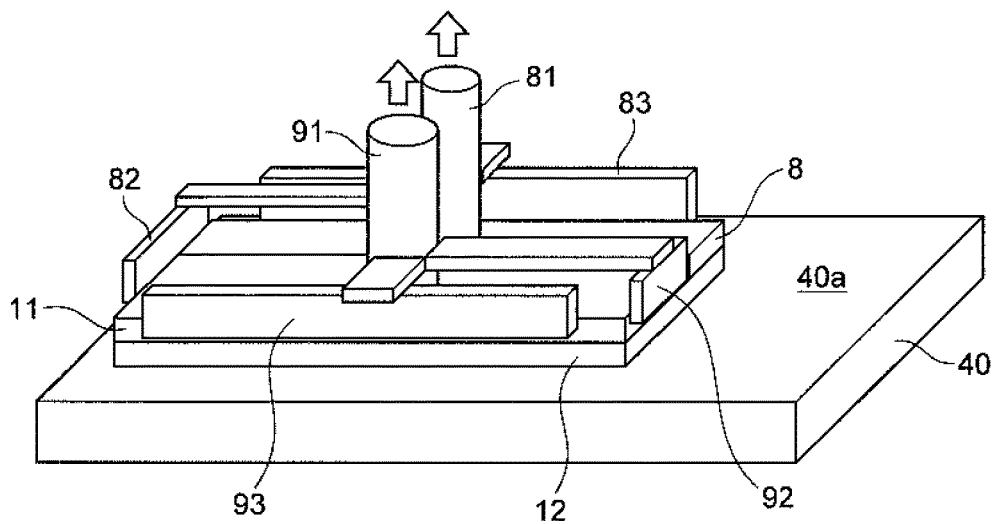
FIG. 21(b) is a perspective view showing the first and second cell arrays and the light-receiving element array positioned by the fourth method.

FIGS. 21(*a*) and 21(*b*) show the fourth method using a flat support plate 40 having an upper surface 40*a* (X-reference surface 19), a first jig 80 comprising plate members 82, 83 having a Y reference surface 20 and a Z reference surface 21, which are fixed to a suction nozzle 81, and a second jig 90 comprising plate members 92, 93 having a Y reference surface 20 and a Z reference surface 21, which are fixed to a suction nozzle 91, to carry out the positioning of the first and second single arrays 8, 11 and the light-receiving element array 12. In this method, the light-receiving element array 12 is placed on the upper surface 40*a* (X-reference surface 19) of the flat support plate 40, one single array (for example, the first single array 8) is held by the first jig 80, and the other single array (for example, the second single array 11) is held by the second jig 90.

After the light-receiving element array 12 coated with an optical adhesive resin on an upper surface is placed on the upper surface 40*a* of the support plate 40, the first and second jigs 80, 90 to which the first and second single arrays 8, 11 are fixed move down to adhere the first and second single arrays 8, 11 to the light-receiving element array. In this case, the positions of the first and second single arrays 8, 11 are finely adjusted such that they abut the Y reference surface 20 and the Z reference surface 21. A long plate member 82 constituting the Y reference surface of the first jig 80, to which the first single array 8 is fixed, comes into contact with the Z-direction side surface of the second jig 90, to which the second single array 11 is fixed, thereby enabling the precise positioning of the first and second single arrays 8, 11 in Y and Z-directions.

After the radiation detector is formed by adhering the first and second single arrays 8, 11 to the light-receiving element array 12, the first and second jigs 80, 90 are removed, and suction is stopped. The resultant radiation detector is conveyed by another suction nozzle to a tray, etc. for subsequent operations. In this method, too, conveyance by suction nozzles enables continuous operations suitable for mass production.

In any method, the first single array having at least m×1 first cells and the second single array having at least m×1 second cells are aligned with and adhered to the light-receiving element array having at least m×2 light-receiving elements, producing a radiation detector ideally in as short a time period as 1/m that of a conventional method in which individual single arrays are aligned with the light-receiving elements.

In any method, because dimensional precision is extremely important on the side surfaces of the first and second single arrays, reflective layers on their side surfaces should have precisely the same thickness. Because an excess adhesive overflows from adhesion interfaces after the first and second single arrays are adhered to the light-receiving element array, reflective layers on the side surfaces may be cut to a predetermined depth, to remove the adhesive and adjust the reflective layers to final thickness. By conveying the first and second single arrays by suction nozzles, operations can be easily automated.

EFFECT OF THE INVENTION

The method of the present invention can efficiently produce a dual-array radiation detector comprising two types of scintillators having different compositions for different detection sensitivity distributions of radiation energy.

The method of the present invention having the above features is suitable for producing dual-array radiation detectors for medical CT apparatuses, baggage-inspecting CT apparatuses, etc.

What is claimed is:

1. A method for producing a radiation detector comprising pluralities of first and second cells constituted by scintillators having different compositions for different detection sensitivity distributions of radiation energy, pluralities of light-receiving elements each receiving light emitted from each of the first and second cells by radiation to convert the light to electric signals, and reflective layers for guiding the light emitted from said first and second cells to said light-receiving elements, comprising a step of forming a first cell array having at least m×n first cells bonded by said reflective layers from a first scintillator plate, wherein m and n are natural numbers of 2 or more, which may be the same or different;

a step of forming a second cell array having at least m×n second cells bonded by said reflective layers from a second scintillator plate having a different composition from that of the first scintillator plate;

a step of cutting said first cell array to obtain at least n first single arrays each comprising at least m×1 first cells bonded by said reflective layers;

a step of cutting said second cell array to obtain at least n second single arrays each comprising at least m×1 second cells bonded by said reflective layers;

a step of aligning each first single array of one composition and each second single array of another composition with a light-receiving element array having at least m×2 light-receiving elements, such that said first and second cells oppose said light-receiving elements; and a step of adhering said first single array and said second single array to said light-receiving element array such that said first single array and said second single array are placed side-by-side on said light-receiving elements.

2. The method for producing a radiation detector according to claim 1, wherein in the aligning step, said first and second cells and said light-receiving elements are positioned, with side surfaces of said first and second single arrays and a side surface of said light-receiving element array abutting reference surfaces.

3. The method for producing a radiation detector according to claim 2, wherein a jig having perpendicular reference surfaces is used in the aligning step, to position said first and second cells and said light-receiving elements by said reference surfaces.

4. The method for producing a radiation detector according to claim 1, wherein each step of forming said first and second cell arrays comprises
   a step of fixing each scintillator plate to a support plate with an adhesive sheet;
   a step of cutting each fixed scintillator plate to at least m×n cells;
   a step of coating each cell with a reflective layer resin, and curing said reflective layer resin to form a resin-cured assembly; and
   a step of peeling said adhesive sheet from said resin-cured assembly.

5. The method for producing a radiation detector according to claim 4, wherein said adhesive sheet has a thermally-peelable adhesive layer, so that it is peeled from said resin-cured assembly by heating to 80° C. or higher.

6. The method for producing a radiation detector according to claim 4, wherein said coating step comprises a step of forming a frame surrounding said first and second cells, a step of fixing said frame to said support plate, and a step of pouring said reflective layer resin into a space surrounded by said frame.

7. The method for producing a radiation detector according to claim 6, wherein said frame is formed by attaching adhesive sheets to side surfaces of said support plate, such that they surround said first and second cells.

* * * * *